US005802482A

United States Patent [19]

Sun

[11] Patent Number: 5,802,482
[45] Date of Patent: Sep. 1, 1998

[54] SYSTEM AND METHOD FOR PROCESSING GRAPHIC LANGUAGE CHARACTERS

[75] Inventor: Lining Sun, San Jose, Calif.

[73] Assignee: Silicon Graphics, Inc., Mountain View, Calif.

[21] Appl. No.: 638,217

[22] Filed: Apr. 26, 1996

[51] Int. Cl.[6] .................... G06F 11/00; G06F 15/38
[52] U.S. Cl. ................................. 704/8; 707/535
[58] Field of Search .................... 704/11-2, 8; 400/110; 707/535; 341/22, 28; 364/927.2; 382/185

[56] References Cited

U.S. PATENT DOCUMENTS

| | | | |
|---|---|---|---|
| 4,670,841 | 6/1987 | Kostopoulos | 364/419 |
| 4,670,842 | 6/1987 | Metwaly | 364/419 |
| 4,727,511 | 2/1988 | Sekiguchi | 707/524 |
| 4,761,761 | 8/1988 | Sekiguchi | 364/900 |
| 4,829,583 | 5/1989 | Monroe et al. | 382/185 |
| 4,870,402 | 9/1989 | DeLuca et al. | 340/825.44 |
| 4,937,745 | 6/1990 | Carmon | 707/535 |
| 5,050,121 | 9/1991 | Vaughan | 364/900 |
| 5,079,702 | 1/1992 | Ho | 364/419 |
| 5,119,296 | 6/1992 | Zheng et al. | 364/419 |
| 5,124,694 | 6/1992 | Dien | 345/142 |
| 5,187,480 | 2/1993 | Thomas et al. | 341/22 |
| 5,305,207 | 4/1994 | Chiu | 364/419.09 |
| 5,309,358 | 5/1994 | Andrews et al. | 364/419.01 |
| 5,317,509 | 5/1994 | Caldwell | 364/419.08 |
| 5,337,233 | 8/1994 | Hofert et al. | 364/419.14 |
| 5,387,042 | 2/1995 | Brown | 400/477 |

*Primary Examiner*—David R. Hudspeth
*Assistant Examiner*—Patrick N. Edouard
*Attorney, Agent, or Firm*—Sterne, Kessler Goldstein & Fox P.L.L.C.

[57] ABSTRACT

A system and method is described for processing foreign language characters. An input processor parses input language data into combinations dictated by a set of combining rules. The combining rules are application and language dependent. The data structures generated by the input processor comprises a header and one or more characters or character strings. The header further comprises a layout field that identifies the relative position of the one or more characters or character strings.

9 Claims, 6 Drawing Sheets

SYSTEM AND METHOD FOR PROCESSING GRAPHIC LANGUAGE CHARACTERS

BACKGROUND OF THE INVENTION

1. Field of the Invention

The present invention relates generally to the processing of foreign language characters, and more specifically is directed toward the input and display of foreign language characters on a computer screen.

2. Related Art

In contrast to the 26-letter English alphabet, foreign language character sets can potentially include thousands of individual characters (e.g., Kanji characters in the Japanese language). For this reason, computer processing of foreign language characters introduces a number of complications. A first complication is evident within the input process itself. For English language input, standard U.S. computer keyboards permit a unique one-to-one correspondence between keys and the character sought to be displayed. For foreign language input (e.g., Chinese, Japanese, etc.), a variety of input methods can be used. These input methods can utilize either standard U.S. keyboards or specialized keyboards that are customized for the demands of a particular language. In either case, a sequence of keystrokes is typically required to uniquely identify a foreign language character.

In some conventional systems, the series of keystrokes is used as an index into a database that contains a library of the foreign language characters. Various language-dependent techniques have been defined to uniquely specify a logical series of keystrokes that are required to produce a particular foreign language character. Alternatively, a series of keystrokes can be translated to correspond to a standardized double-byte index. These standardized double-byte indexes allows a user to access large character databases.

Some conventional systems have reduced the size of foreign language character libraries by identifying common subunits within different foreign language characters. In this manner, characters can be reproduced based upon an aggregation of subunits that are retrieved from a smaller, more manageable character library. This process of identifying, retrieving, and displaying aggregates of character subunits is highly language dependent. Specifically, each component in the process must be able to identify the rules that dictate permissible combinations. Portability of the software system is therefore limited.

SUMMARY OF THE INVENTION

The present invention is directed to a system and method for processing foreign language characters using language and application dependent combining rules. These combining rules are used by an input processor to parse language data that is received from a file system or a keyboard. In this parsing process, the input processor creates data structures for input sequences which conform to the combining rules. The input processor does not require any knowledge of the language or application in which it is operating. It merely combines language data into permissible combinations that are dictated by the combining rules.

In a first embodiment, the input processor combines language data that specifies the subunits of an individual character. For example, in the Thai language, consonants, vowels, diacritics and tone marks can occupy one or more positions (e.g., top and bottom) within a character. Based upon the combining rules, the input processor creates data structures that represent a single character. The data structure comprises a header and the individual subunit characters. The header further comprises a layout field that defines the relative position of the individual character subunits.

In a second embodiment, the input processor combines language data that specifies both the character and its pronunciation. For example, in the Japanese language, Kanji characters can have multiple pronunciations. These pronunciations can be used in the indexing and sorting of Kanji characters. Based upon the combining rules, the input processor creates data structures that represent a single Kanji character and its Hiragana or Katakana pronunciations.

The data structure comprises a header and one or more character strings. The header further comprises a layout field that defines the relative position of the character strings.

The foregoing and other features and advantages of the invention will be apparent from the following, more particular description of a preferred embodiment of the invention, as illustrated in the accompanying drawings.

BRIEF DESCRIPTION OF THE FIGURES

In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The processing and display of graphic language characters typically requires specialized hardware and/or software. For example, customized input devices are often required to effectively define a foreign language character set through a predefined series of keystrokes. Moreover, specialized software is typically required to recognize and process language dependent input data streams. As one can readily appreciate, hardware/software systems dedicated for an application within a first language or dialect will typically be unusable in an application within a second language or dialect. Generally, portability of the underlying system is limited. Therefore, the task for software vendors is to provide a generic facility that can be applied to various applications in various languages.

Figure 1:
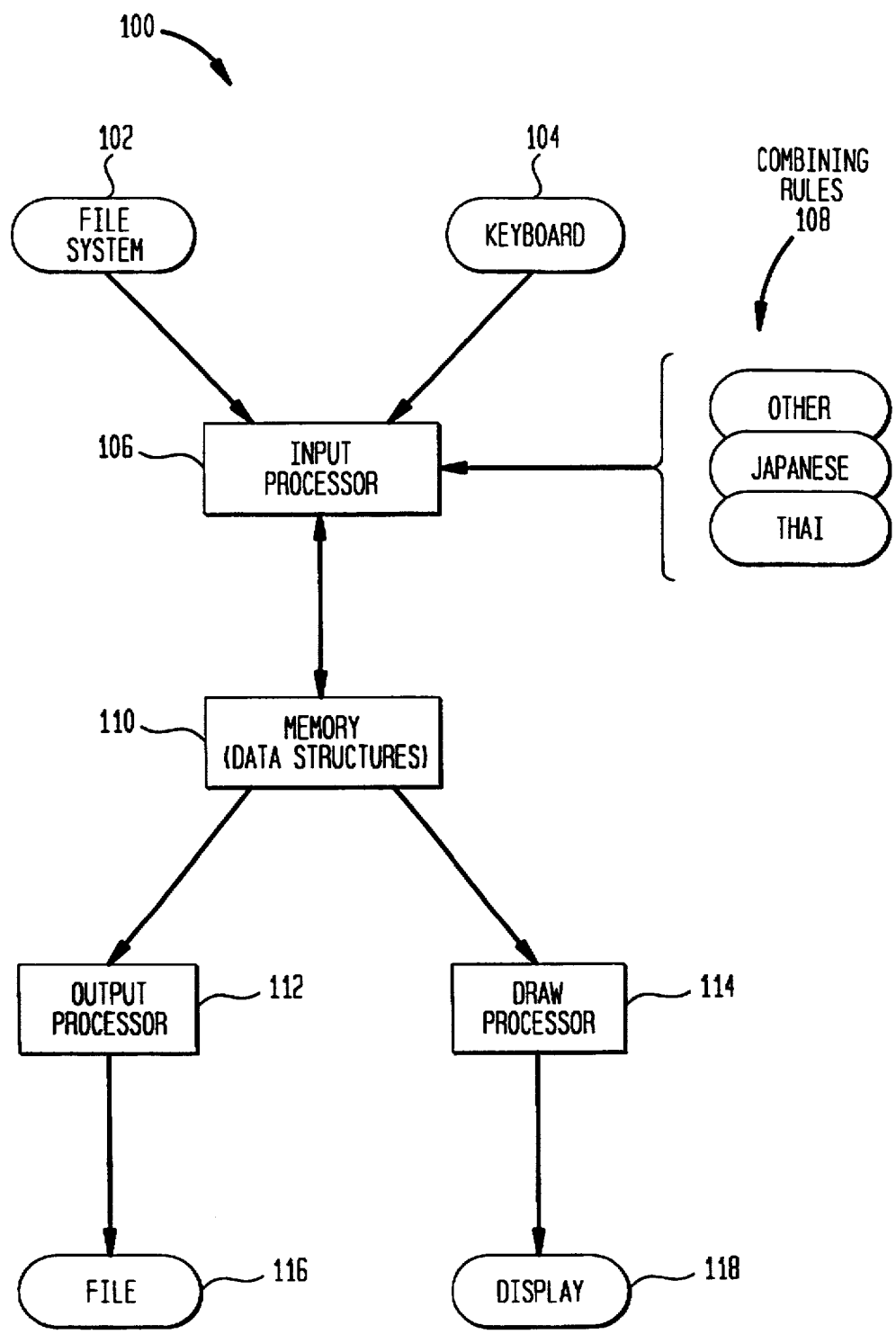
FIG. 1 illustrates a preferred embodiment of a graphical language processing system.

FIG. 1 illustrates a preferred embodiment of a system 100 that incorporates such a generic facility. In the processing of graphical language characters, input processor 106 receives input from either file system 102 or keyboard 104. In one embodiment, keyboard 104 is a specialized keyboard that sends key data to a converter (not shown). The converter translates the keyboard data into single (or multiple) byte representation and forwards the translated keyboard data to input processor 106. This single (or double) byte representation is an index into a predefined foreign language character set. Generally, this process is similar to the conversion of input from standard U.S. keyboards into single byte ASCII representation. As shown, an alternative input path uses file system 102. In one embodiment, file system 102 provides a stream of input data that has previously been converted into single (or multiple) byte representation.

Upon receipt of an input data stream from either file system 102 or keyboard 104, input processor 106 combines the data into data structures that represent individual units of display. An individual unit of display refers generically to the display of one or more character glyphs at a cursor position. A character glyph is a pictograph or symbol that bears information, which can represent a whole or a part of a character. Generally, the data structures include subunits of the individual unit of display. Additionally, the data structure includes a header that defines the relative positioning of each of the subunits. These data structures are described with reference to exemplary applications as detailed below.

In a preferred embodiment, input processor 106 parses the single (or multiple) byte input data into data structures based upon combining rules 108. Combining rules 108 represent the language and application dependent features of processing system 100. In other words, input processor 106 does not have any knowledge about the syntax or grammar of the operating language. It merely generates data structures based upon the validity of the input data with respect to combining rules 108. Meaningless data structures can therefore be generated if the input data are in the wrong context (e.g., wrong sequence). The operation of input processor 106 is analogous to the generation of English words without a spell checker.

Figure 2:
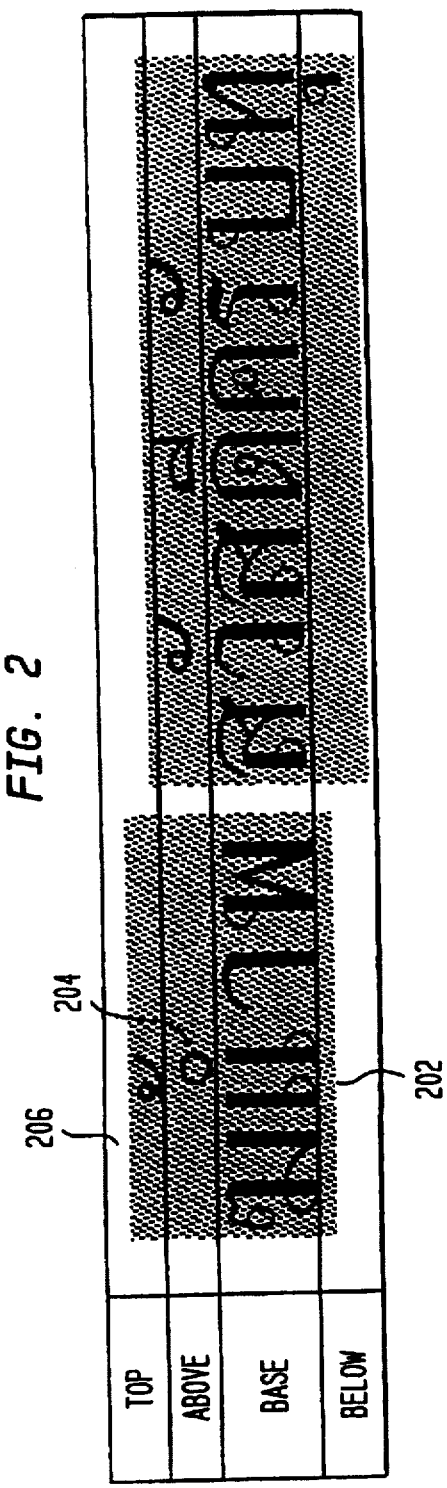
FIG. 2 illustrates combined Thai language characters.

As a first example of this combination process, consider an application that generates Thai language characters. Generally, Thai language characters include consonant, vowel, tone mark, and diacritic character subunits. As illustrated in FIG. 2, character subunits within each of these categories are restricted to one or more positions within a character. These positions are identified as the top, above, base and below positions. Table 1 illustrates the possible positions that each of the consonant, vowel, tone mark, and diacritic character subunits can occupy.

Due to the number of possible combinations of character subunits, the present invention identifies Thai character subunits individually rather than the character as a whole. In this manner, the number of character glyphs that are stored in a character library is significantly reduced.

TABLE 1

| Position | Permissible Categories |
|---|---|
| Top | Tone Mark, Diacritic |
| Above | Vowel, Tone Mark |
| Base | Consonant |
| Below | Vowel, Diacritic |

Character subunit input data received from file system 102 or keyboard 104 can be represented by single byte indexes into the character library. The role of input processor 106 is to combine these single byte indexes into data structures that represent valid Thai characters with respect to combining rules 108. For the Thai language of FIG. 2, exemplary combining rules can be represented by the rules listed in Table 2.

TABLE 2

| SEQ | Position 1 (320) | Position 2 (330) | Position 3 (340) |
|---|---|---|---|
| 1 | BAS Cons. | BLW/ABV Vowel | BLW/ABV/TOP Tone Mark |
| 2 | BAS Cons. | BLW/ABV Vowel | BLW/TOP Diacritic |
| 3 | BAS Cons. | BLW/TOP Diacritic | N/A |
| 4 | BAS Cons. | BLW/ABV/TOP Tone Mark | N/A |
| 5 | BAS Cons. | N/A | N/A |

Each of the rules in Table 2 define a permissible input sequence. For example, consider character subunit sequence 2. If an input data stream from file system 102 or keyboard 104 includes the sequence of a base consonant (labeled BAS Cons.), an above vowel (labeled ABV Vowel), and a top tone mark (labeled TOP Tone Mark), input processor 106 will conclude that the sequence is valid. Examples of incorrect sequences include (1) consonant-vowel-vowel, (2) consonant-tone mark-vowel, and (3) consonant-diacritic-tone mark. Once a valid input sequence is identified, a data structure can be formed for that particular Thai character.

Figure 3:
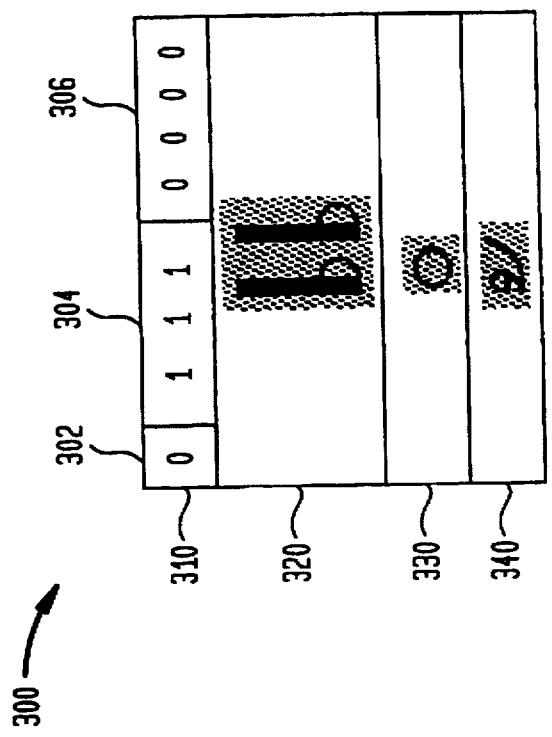
FIG. 3 illustrates a data structure for a combined Thai language character.

FIG. 3 illustrates an example of a Thai character data structure 300. Data structure 300 comprises header 310 and character subunits 320, 330 and 340. Header 310 further comprises fields 302, 304, and 306. Field 302 is a 1-bit field that identifies whether the data structure represents a combined character or a combined string. Combined strings are described in greater detail below. For combined characters, field 302 is set to 0 for a combined string; for a combined string, field 302 is set to 1. Field 304 is a 3-bit field that identifies a relative display position of character subunits 320, 330, and 340. The bits in field 306 are unused in this example.

The number of bits in field 304 can vary based upon the number of character subunits in the data structure and the number of possible display positions for those character subunits. For this particular example, the combining rules dictate that character subunit 320 is occupied by a consonant. That is, a valid input sequence has a consonant as the first subunit. Since consonants are restricted to the base position (see Table 1), character subunit 320 is always assigned to the base position.

Character subunit 330, on the other hand, can be occupied by (1) a vowel in the below or above position, (2) a diacritic in the below or top position, (3) a tone mark in the below, above, or top position, or (4) nothing at all (see Table 2). In sum, character subunit 330 can be placed in either the below, above, or top positions. Finally, if character subunit 320 contains a vowel, character subunit 340 can be occupied by (1) a tone mark in the below, above or top position or (2) a diacritic in the below or top position. In the same manner as character subunit 330, character subunit 340 can be placed in either the below, above or top position. To unambiguously identify all possible display positions, field 304 contains at least 3 bits. Table 3 illustrates character subunit positions according to an embodiment of the present invention.

TABLE 3

| Field 304 | Character Positions |
|---|---|
| 000 | BAS = 1 |
| 001 | BAS = 1, BLW = 2 |
| 010 | BAS = 1, ABV = 2 |
| 011 | BAS = 1, TOP = 2 |

TABLE 3-continued

| Field 304 | Character Positions |
|---|---|
| 100 | BAS = 1, BLW = 2, ABV = 3 |
| 101 | BAS = 1, BLW = 2, TOP = 3 |
| 110 | BAS = 1, ABV = 2, BLW = 3 |
| 111 | BAS = 1, ABV = 2, TOP = 3 |

In the exemplary data structure of FIG. 3, field 304 is specified as 111. As listed in Table 3, the value of 111 places character subunit 320 at the base position, character subunit 330 at the above position, and character subunit 340 at the top position. This relative positioning is illustrated in FIG. 2 as positions 202, 204, and 206, respectively.

Figure 6:
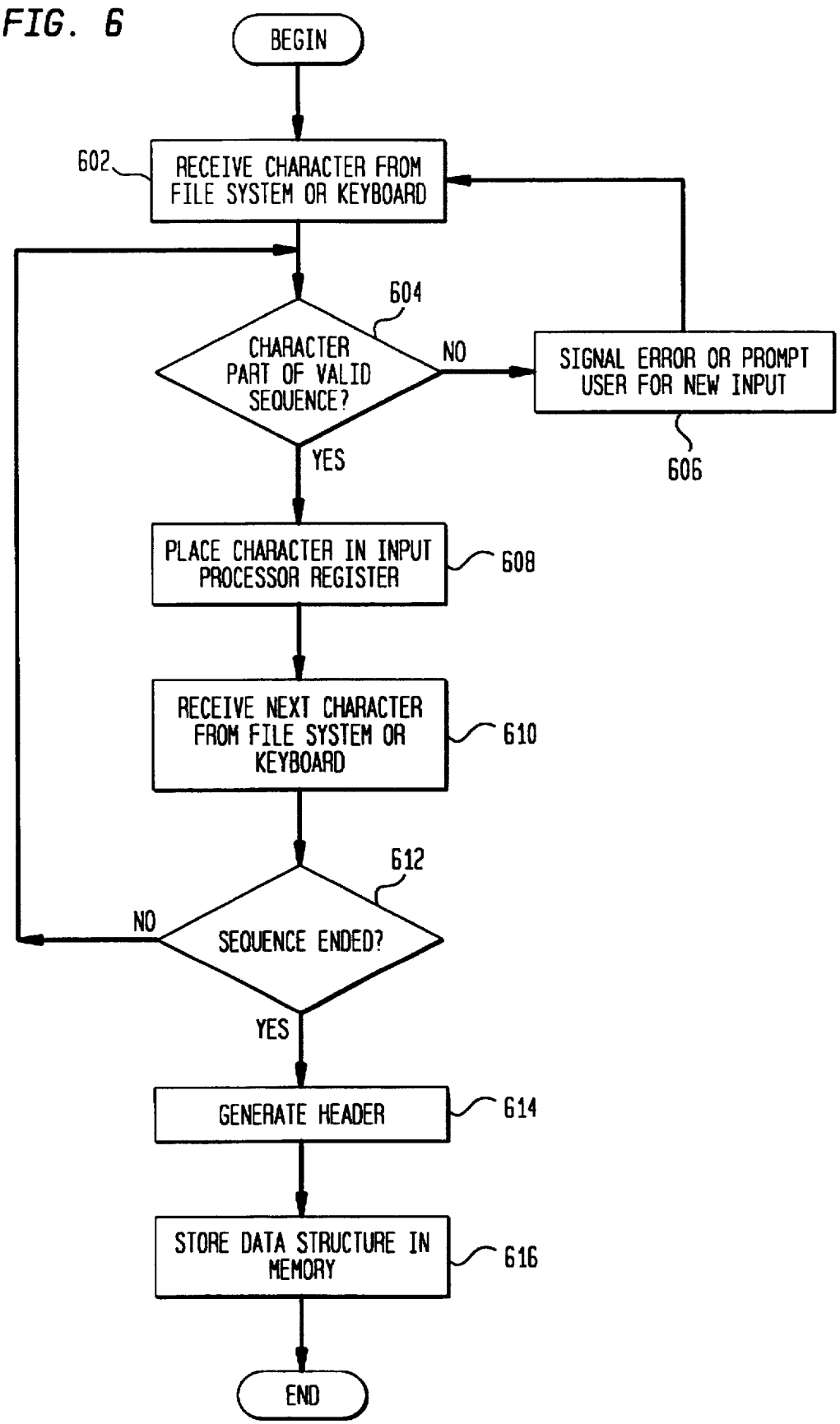
FIGS. 6 and 7 illustrate flow charts of the processing of the present invention.

Having identified the contents of a data structure, the process of generating a data structure is now described with reference to the flow chart of FIG. 6. In step 602, input processor 106 receives a character from either file system 102 or keyboard 104. In one embodiment, the character is in the form of a single (or multiple) byte index. Next, in step 604, input processor 106 determines whether the received character is part of a valid sequence. In the Thai example described above, the combining rules specify that the first character in a sequence is the base consonant (see Table 2). Thus, if the first character in a sequence is not a consonant, input processor 106 knows that an error has occurred. In step 606, input processor 106 can signal an error or prompt a user to reenter a character at keyboard 104.

If the received character is part of a valid sequence, it is placed in a register (not shown) within input processor 106. This process is represented by step 608. In step 610, the next character is received from file system 102 or keyboard 104. After the next character is received, a determination is made in step 612 whether a combined character sequence has ended. In the Thai example described above, the end of the sequence can be identified by a receipt of a second consonant. This would indicate that a new combined character sequence has started. In other embodiments, the end of a character sequence can be identified by an arbitrary control character.

If input processor 106 determines, in step 612, that a combined character sequence has not ended, the process returns to step 604 where the character is validated with respect to combining rules 108. For example, if the next character is a vowel that follows a previous consonant-vowel sequence, the character is invalidated. Generally, if the character is validated in step 604, the process then proceeds in a similar manner through steps 608, 610, and 612.

If input processor 106 determines, in step 612, that a combined character sequence has ended, the process continues to step 614 where input processor 106 generates a header for the data structure. This header (e.g., header 310) includes information that defines the relative position of the characters subunits within the combined character. Finally, in step 616, input processor 106 stores the generated data structure in memory 110.

Figure 7:
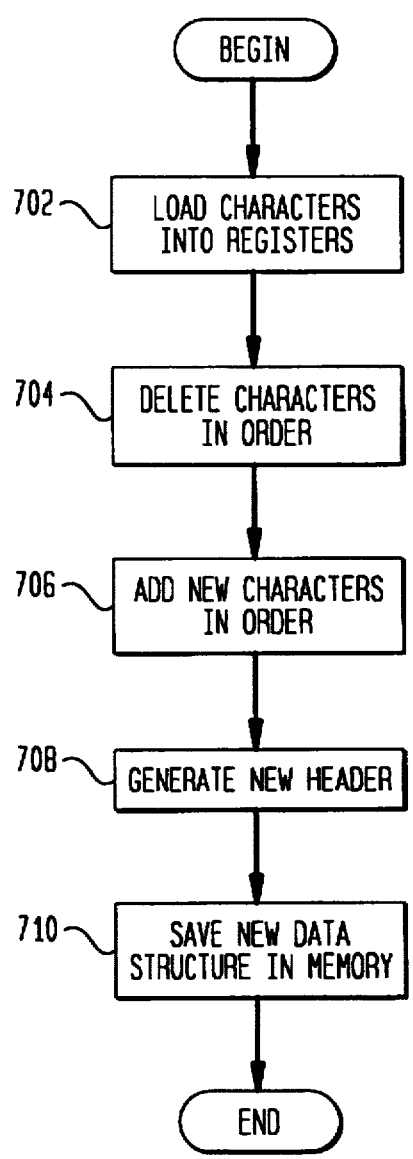

As illustrated by the flow chart of FIG. 7, input processor 106 can also edit data structures that have been previously stored in memory 110. This editing process begins in step 702 where input processor 106 loads one or more characters of a data structure into one or more registers. In step 704, input processor 106 deletes one or more of the characters stored in the registers based upon the control of a user. In a preferred embodiment, this deletion process occurs sequentially. In other words, the characters are deleted in a reverse order of the input process. For example, in FIG. 2, the characters 202, 204 and 206 would be input in that order (see sequence 2 of Table 2). If character 204 is sought to be changed, character 206 and character 204 are deleted in that order.

After the deletion process is completed, the user, in step 706, provides one or more characters that are sought to be inserted. These new characters are checked with respect to the combining rules in the same manner as illustrated in FIG. 6. If the new character sequence is validated, a new header is generated in step 708. Finally, the edited data structure is stored in memory 110.

As the Thai language example illustrates, a data structure can represent a foreign language character that can be divided into individual character subunits. As one can readily appreciate, the present invention is not confined to a specific number or type of character subunit. Moreover, the present invention is not confined to the subunit display positions (i.e., top, above, base, below) of FIG. 2. Various other positions can be defined in the context of the demands of a specific foreign language.

As the next example illustrates, the present invention can be extended beyond the display of single foreign language characters. In particular, the present invention can be applied to displays of foreign language characters and their associated pronunciations. For example, consider the Japanese language which includes Kanji, Hiragana, and Katakana characters. Unlike Hiragana and Katakana characters, Kanji characters are not phonetically based. Accordingly, the Kanji character set numbers in the thousands.

Figure 4:
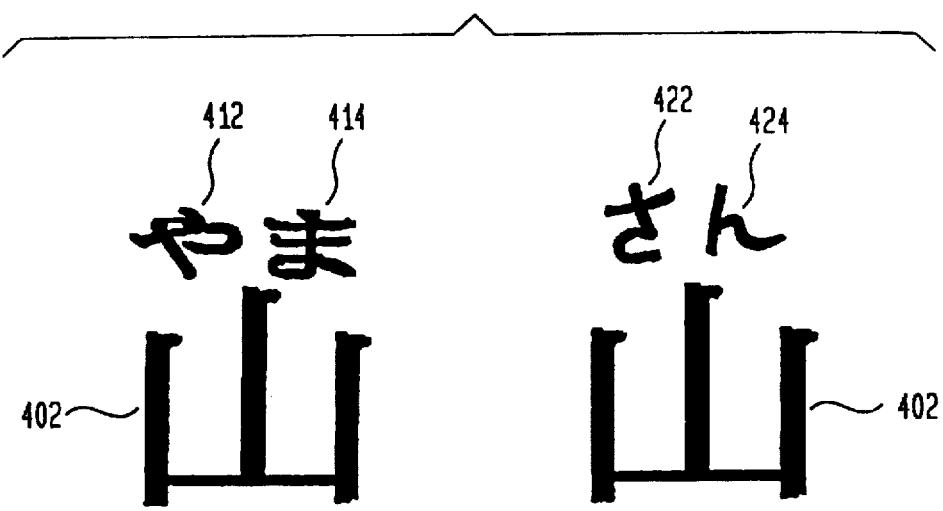
FIG. 4 illustrates combined Japanese language strings.

One problem that exists in the processing of Kanji characters is the existence of multiple pronunciations for a single Kanji character. For example, consider Kanji character 402 in FIG. 4. Kanji character 402 has two pronunciations. The first pronunciation, "ya-ma", is represented by Hiragana characters 412 and 414. The second pronunciation, "san", is represented by Hiragana characters 422 and 424.

Figure 5:
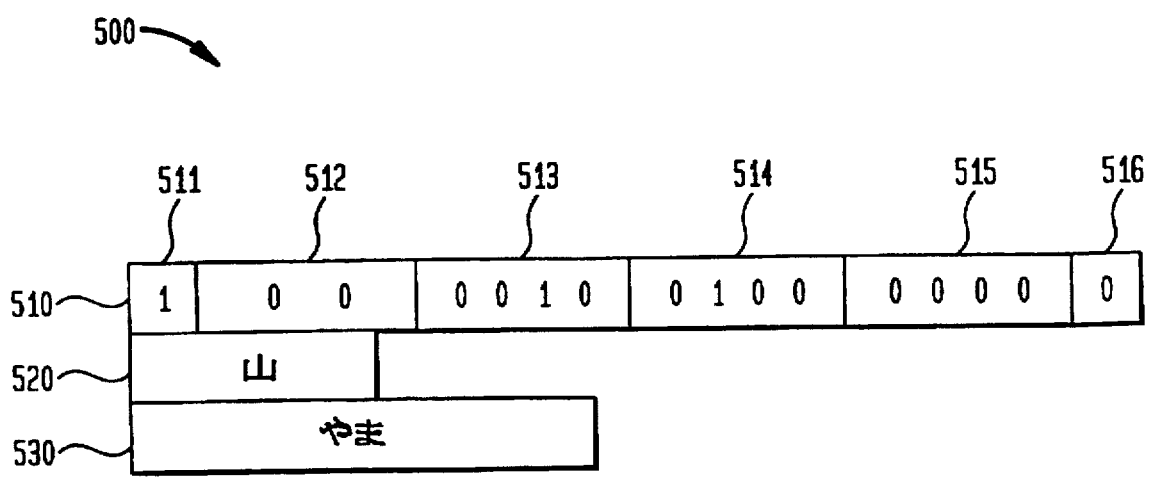
FIG. 5 illustrates a data structure for a combined Japanese language string.

In many publishing applications, the pronunciation of the Kanji character is used for indexing or sorting. To support this function, the Hiragana or Katakana characters are stored and or displayed with the Kanji character. In the present invention, the Kanji character and its Hiragana or Katakana pronunciation are stored as a combined string. An exemplary data structure 500 representing the combined string is illustrated in FIG. 5.

Data structure 500 comprises header 510 and strings 520 and 530. String 520 includes the multi-byte representation for Kanji character 402. String 530 includes the multi-byte representation for Hiragana characters 412 and 414. Header 510 further comprises information fields 511–516. Information field 511 identifies data structure 500 as either a combined character or a combined string. As noted above, field 511 is set to a 1 for combined strings. Information field 512 identifies the relative position of strings 520 and 530.

If a simple combining rule is chosen such that a Kanji character is received first, followed by a string of Hiragana or Katakana characters, 2 bits can be used to identify the relative display positions of the character strings. These relative display positions can be in a left-right or top-bottom orientation. This simple listing of positions is illustrated in Table 4. In representing the "ya-ma" pronunciation of Kanji character 402, information field 511 is set to 00. That is, Kanji character 402 is at the base and Hiragana characters 412, 414 are at the top.

TABLE 4

| Field 511 | String Positions |
|---|---|
| 00 | BAS = 1, TOP = 2 |
| 01 | BAS = 1, BTM = 2 |
| 10 | BAS = 1, RGT = 2 |
| 11 | BAS = 1, LFT = 2 |

Information fields 513–515 identify the number of bytes of each of the strings. Specifically, field 513 identifies the number of bytes in string 1, field 514 identifies the number of bytes in string 2, and field 515 identifies the number of bytes in string 3 (unused in this example). For exemplary data structure 500, field 513 is set to 0010 (i.e., field 513 contains a single double-byte index) and field 514 is set to 0100 (i.e., field 513 contains two double-byte indexes). This assumes that each of the Kanji and Hiragana characters requires a two byte representation. Finally, in this example, information field 516 is unused.

As the Japanese language example illustrates, a data structure can be used to represent one or more characters having a specified relation (e.g., pronunciation). As one can readily appreciate, the present invention is not confined to a specific number or type of character strings. Moreover, the present invention is not confined to the character string display positions (e.g., top and bottom) of FIG. 4. Various other positions can be defined in the context of the demands of a specific foreign language application. Generally, the creation and editing of combined string data structures follows the processes illustrated in FIGS. 6 and 7.

Referring back to FIG. 1, the generation of data structures representing combined characters or strings is stored in memory 110. These data structures can be retrieved from memory 110 by output processor 112 or draw processor 114. Both output processor 112 and draw processor 114 render the characters or strings in the order defined by the header. Draw processor 114 outputs the rendered characters or strings to display 118 while output processor 112 outputs the rendered characters or strings to file 116. The process of generating a single bit-mapped representation based upon the character units or strings in the data structures would be apparent to one of ordinary skill in the relevant art and are not described in greater detail.

Figure 8:
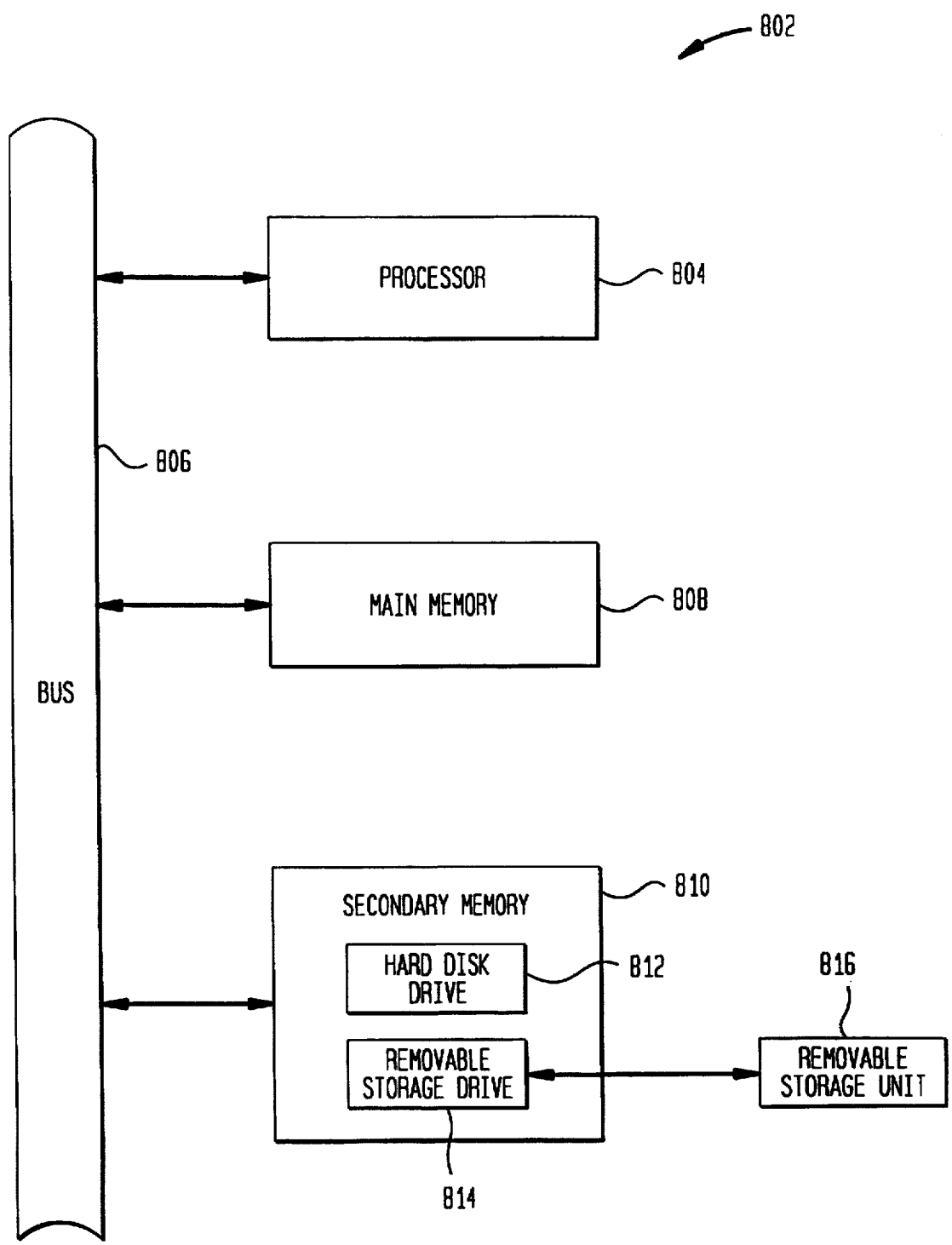
FIG. 8 illustrates a block diagram of a computer useful for implementing elements of the present invention.

In one embodiment, the invention is directed to a computer system operating as discussed herein. An exemplary computer system 802 is shown in FIG. 8. The computer system 802 includes one or more processors, such as processor 804. The processor 804 is connected to a communication bus 806.

The computer system 802 also includes a main memory 808, preferably random access memory (RAM), and a secondary memory 810. The secondary memory 810 includes, for example, a hard disk drive 812 and/or a removable storage drive 814, representing a floppy disk drive, a magnetic tape drive, a compact disk drive, etc. The removable storage drive 814 reads from and/or writes to a removable storage unit 818 in a well known manner.

Removable storage unit 818, also called a program storage device or a computer program product, represents a floppy disk, magnetic tape, compact disk, etc. As will be appreciated, the removable storage unit 818 includes a computer usable storage medium having stored therein computer software and/or data.

Computer programs (also called computer control logic) are stored in main memory and/or the secondary memory 810. Such computer programs, when executed, enable the computer system 802 to perform the features of graphical language character processing as discussed herein. In particular, the computer programs, when executed, enable the processor 804 to perform the features of the present invention. Accordingly, such computer programs represent controllers of the computer system 802.

In another embodiment, the invention is directed to a computer program product comprising a computer readable medium having control logic (computer software) stored therein. The control logic, when executed by the processor 804, causes the processor 804 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the invention has been particularly shown and described with reference to preferred embodiments thereof, it will be understood by those skilled in the relevant art that various changes in form and details may be made therein without departing from the spirit and scope of the invention.

What is claimed is:

1. A method for processing graphical language characters, comprising the steps of:

(1) receiving, by an input processor, a stream of language input data;

(2) parsing, by said input processor, said stream of language input data based upon a set of combining rules;

(3) generating, by said input processor, a data structure that comprises a header and one or more display units, wherein said header further comprises a layout field that identifies a relative display position of said one or more display units;

(4) storing said data structures in memory; and (5) retrieving, by an output device, said data structure and outputting, at an individual unit of display, said one or more display units in accordance with said layout field of said header.

2. The method of claim 1, wherein said step (1) comprises the step of receiving, by an input processor, a stream of language input data from a keyboard.

3. The method of claim 1, wherein said step (1) comprises the step of receiving, by an input processor, a stream of language input data from a file system.

4. The method of claim 1, wherein said step (2) comprises the steps of:

(a) receiving a display unit;

(b) determining whether said display unit is part of a valid display unit sequence, said step of determining based on said set of combining rules; and (c) placing said display unit in an input processor register.

5. The method of claim 1, wherein said step (5) comprises the step of outputting, at an individual unit of display, one or more character units in accordance with said layout field of said header.

6. The method of claim 1, wherein said step (5) comprises the step of outputting, at an individual unit of display, one or more character strings in accordance with said layout field of said header.

7. The method of claim 1, wherein said step (5) comprises the step of retrieving, by a draw processor, said one or more display units for display on a screen.

8. The method of claim 1, wherein said step (5) comprises the step of retrieving, by an output processor, said one or more display units for storage in a file.

9. A computer program product, comprising:

a computer usable medium having computer readable program code means embodied in said medium that provides graphical language character processing, said computer readable program code means comprising:

computer readable program code means for causing a computer to receive a stream of language input data;

computer readable program code means for causing a computer to parse said stream of language input data based upon a set of combining rules;

computer readable program code means for causing a computer to generate a data structure that comprises a header and one or more display units, wherein said header further comprises a layout field that identifies a relative display position of said one or more display units;

computer readable program code means for causing a computer to store said data structures in memory; and computer readable program code means for causing a computer to retrieve said data structure and outputting, at an individual unit of display, said one or more display units in accordance with said layout field of said header.

* * * * *